(No Model.)

T. TELLEFSEN.
SALT BOX.

No. 578,952. Patented Mar. 16, 1897.

Witnesses
Thos. W. B. Thomson
William P. Smith

Inventor
Tellef Tellefsen
by Frank E. Adams
Attorney

THE NORRIS PETERS CO., PHOTO-LITHO., WASHINGTON, D. C.

UNITED STATES PATENT OFFICE.

TELLEF TELLEFSEN, OF SEABOLD, WASHINGTON.

SALT-BOX.

SPECIFICATION forming part of Letters Patent No. 578,952, dated March 16, 1897.

Application filed August 2, 1895. Serial No. 557,939. (No model.)

*To all whom it may concern:*

Be it known that I, TELLEF TELLEFSEN, a citizen of the United States, residing at Seabold, in the county of Kitsap and State of Washington, have invented a new and useful Salt Box or Receptacle, of which the following is a specification.

My invention relates to improvements in salt-boxes in which a revolving cylinder operates in conjunction with a perforated concave in grating lumps of salt, a drawer being provided for catching the relieved salt; and the objects of my improvement are, first, to produce a grater consisting of a cylinder and concave which will operate without becoming clogged with the lumps of salt; second, to afford facilities for removing the fine salt from the drawer in a clean and economical manner, and, third, to provide for the attachment of the concave and a dished funnel without the aid of nails or screws. I attain these objects by the mechanism illustrated in the accompanying drawings, in which—

Figure 2:
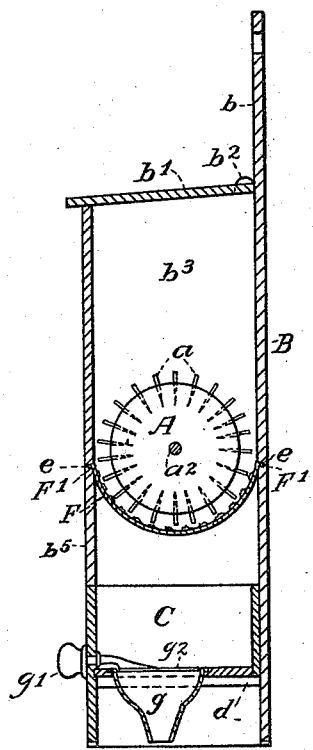
Figure 1:
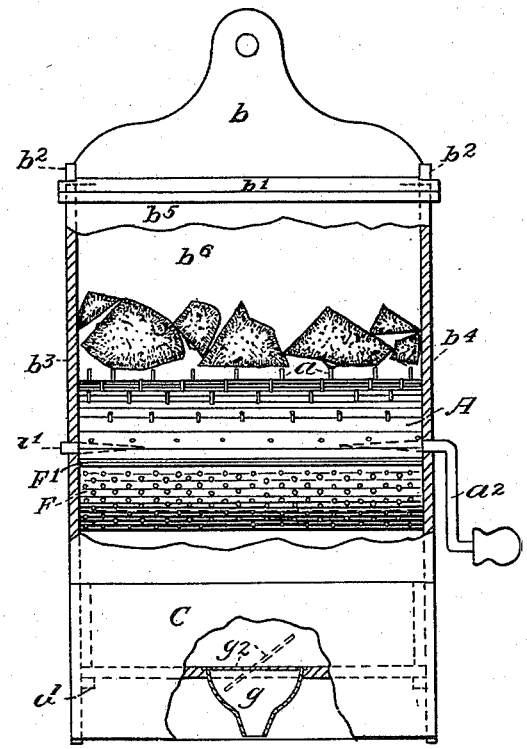
Figure 4:
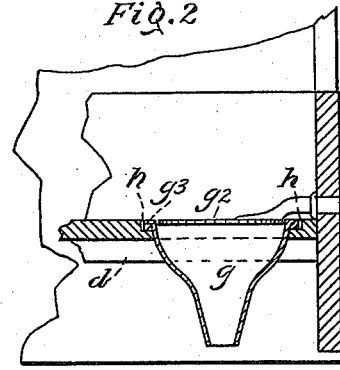
Figure 3:
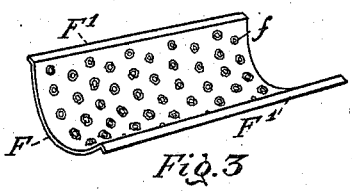
Figure 5:
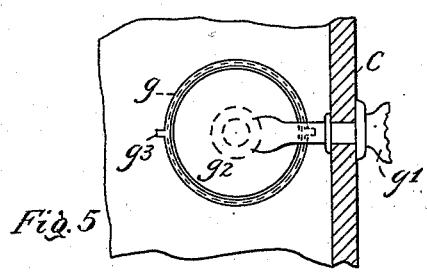

Figure 1 is a front elevation of my salt-box with a portion of the drawer and front broken away; Fig. 2, a side elevation in section, showing the flanged and dished funnel; Fig. 3, a perspective view of the perforated roughened concave; Fig. 4, a detailed view of the dished funnel and disk-formed cover, and Fig. 5 a plan view of same.

Similar letters refer to similar parts throughout the several views.

The box B, its lip $b$, cover $b'$, and drawer C, which are all constructed of wood, constitute the body of the receptacle. The cover $b'$ is attached to lugs $b^2$ by means of pivots, which allow for raising same.

The cylinder A is provided with journals, which are contained in the sides $b^3$ and $b^4$ of box B. This cylinder is also provided with spikes $a$, which are driven into the face around the periphery on a spiral line, one end of the spikes being of round form and projecting from the cylinder, the other end being squared and pointed to provide for their being driven into the cylinder, which I prefer to construct of wood. This spiked cylinder is revolved by means of a crank-handle $a^2$, which also provides a journal for one end of the cylinder. The other end is provided for by a spike $a'$.

A perforated roughened concave F is placed under the spiked cylinder A. This concave is provided with slides F', which are formed by bending portions of the concave at right angles to its outer surface. These slides are provided for attaching said concave in the box B and to strengthen the slotted sides of the box and keep them from warping, the slots $e$ in the sides of the box B being cut at an angle to serve this double purpose. The roughened concave F is punctured with a dull instrument, which produces the rough perimeters $f$, which act in conjunction with the spikes $a$ of the cylinder A in reducing the lumps of salt.

Below the roughened concave F, I have provided a drawer C, which can be removed from the box B. This drawer slides upon cleats $d$, which are fastened to the ends of box B, and is provided with a knob $g'$, which serves the double purpose of operating the drawer and the disk-formed cover $g^2$, which is attached thereto by means of the offset stem. I provide a circular opening and slots $h$ in the bottom of this drawer for the purpose of attaching the dished funnel $g$ by means of its flange and the lugs $g^3$. The upper or large end of this funnel $g$ I construct in spherical form to allow for the operation of the disk-formed cover $g^2$.

The operations of the knob $g'$, cover $g^2$, and the usefulness of the funnel $g$ I shall more fully explain in the further description of my salt-box.

When desirable to fill the box with salt, the cover $b'$ is first raised and the salt is poured over the spiked cylinder A, the large lumps resting against the outer ends of the spikes $a$, as indicated in Fig. 1, the small lumps and fine salt falling about the cylinder and upon the perforated roughened concave F. The lumps may then be ground by revolving the spiked cylinder A by means of the crank-handle $a^2$, this operation causing the outer ends of spikes $a$ to act upon the lumps, and these spikes being placed spirally around the cylinder the surface of the lump of salt is acted upon without producing ridges, the spikes acting successively across the surface. The small lumps of salt which may fall upon the perforated roughened concave F are ground in a similar manner, the roughened perimeters $f$ assisting in reducing the lumps as they are stirred about by the spikes $a$. The fine salt thus relieved falls through the perforations in the roughened concave F and into the drawer C. In the bottom of this drawer C, I have provided the dished funnel $g$ for conducting the salt from the drawer without the spilling of same. This funnel is very useful in filling salt-shakers which have small necks, as it is very hard to pour salt into this form of a shaker.

To fill a shaker of the above description, the shaker is placed about the small end of the dished funnel $g$, and while the shaker is supported in this position by one hand of the operator the other hand is employed in rotating the knob $g'$ back and forth. This rotation of the knob operates the disk-formed cover $g^2$, causing it to take a scooping movement to the right and left. This scooping movement of the cover is obtained by the use of the offset stem connecting the cover with the knob and is desirable in that it enters the perimeter of the cover into the salt, cutting and breaking it in case it should become slightly caked. This movement of the cover $g^2$ may be varied according to the amount of salt it may be desirable to take from the drawer.

In case the salt should become clogged in the flanged and dished funnel $g$ that part of the disk-formed cover $g^2$ turning into the dished part of the funnel would stir the salt and press it downward, forcing it through the funnel and into the shaker. As clearly seen, the rotation of the knob $g'$ stirs the salt in the drawer and also in the funnel, and also forces it downward in the funnel in case it may stick or clog, thus providing what I have termed my "force-feed." The disk-formed cover $g^2$ thus performs the functions of a valve in retaining the salt in the drawer, of an agitator in stirring and loosening the salt in the drawer and funnel, and of a force-feed in shoving the salt through the lower part of the funnel.

I am aware that prior to my invention boxes or receptacles containing graters or grinders of different types have been in use. I therefore do not claim such an invention broadly; but What I do claim as my invention, and desire to secure by Letters Patent, is—

The combination of the box B, the perforated roughened concave F, the spiked cylinder, the removable drawer C, having a circular opening in its bottom, the flanged and dished funnel sunk therein, the revoluble drawer-knob $g'$, having the offset stem and the disk-formed cover attached thereto, and fitting, but moving freely, in said opening and funnel, substantially as set forth.

TELLEF TELLEFSEN.

Witnesses:
 FRANK E. ADAMS,
 THOS. W. B. THOMSON.